3,022,331
ARYL PHOSPHATES

Herbert F. Bondy, Chesterfield, and John Gumb, Bolsover, Chesterfield, England, assignors to Coalite and Chemical Products Limited, Bolsover, England
No Drawing. Filed July 2, 1958, Ser. No. 746,083
Claims priority, application Great Britain July 17, 1957
4 Claims. (Cl. 260—461)

The invention relates to aryl phosphates and particularly to aryl phosphates suitable for use as plasticisers.

It is well known that the two plasticisers tritolyl phosphate (tricresyl phosphate) and trixylenyl phosphate, are toxic and cause paralysis if taken neat and in relatively large quantities, tritolyl phosphate being appreciably more toxic than trixylenyl phosphate. By reason of their toxicity, the two plasticisers cannot be used in synthetic resins which are likely to come into contact with foodstuffs for human consumption and are even excluded from use in synthetic resins and plastics which are likely to come into contact with the human body.

It is an object of the invention to provide a non-toxic aryl phosphate which may be used as a plasticiser in synthetic resins so that the plasticised synthetic resins may be used under conditions where they are brought into contact with foodstuffs without risk of toxic effects occurring due to the presence of the plasticiser.

Commercial tritolyl phosphate is produced from a phenolic fraction which contains the three cresol isomers together with a small amount of xylenols. Commercial trixylenyl phosphate is also made from a phenolic fraction in which xylenols are the main constituents. However, commercial xylenol fractions also contain small amounts of the three cresol isomers.

It has generally been believed hitherto that the toxicity of tritolyl phosphate and the appreciably lower toxicity of trixylenyl phosphate have been due solely to the presence of tri-ortho-cresyl phosphate, since it has been known for a considerable time that tri-ortho-cresyl phosphate causes paralysis. It is also known that mixed esters containing one or two ortho-cresyl groups are toxic and probably more toxic than the pure ester, tri-ortho-cresyl phosphate.

It has now been found that the toxicity of commercial tritolyl phosphate and commercial trixylenyl phosphate is not due solely to the presence of the ortho-cresyl radical in the phosphate mixture, for example, in the form of the uniform ester tri-ortho-cresyl phosphate, but is also due, at least in part, to the presence of other ortho-alkylphenyl radicals in the phosphate mixture, particularly the ortho-ethylphenyl and ortho-propylphenyl radicals.

According to the invention, there is provided a mixture of aryl phosphates, particularly a mixture of tritolyl and/or trixylenyl phosphates, which is free from phosphates containing one, two or three ortho-alkylphenyl radicals, particularly those in which the alkyl substituent in the ortho position contains not more than 3 carbon atoms.

A preferred mixture of aryl phosphates suitable for use as a non-toxic plasticiser comprises a mixture of trixylenyl phosphates which do not contain the ortho-cresyl, ortho-ethylphenyl and ortho-propylphenyl radicals, the mixture being, in particular, free from tri-ortho-cresyl phosphate, tri-ortho-ethylphenyl phosphate and tri-ortho-propylphenyl phosphate. It is preferred that the content of tri-2:4/2:5-dimethylphenyl phosphates and of phosphates containing 2:4/2:5-dimethylphenyl radicals in the mixture should be low, for example, below 10% and preferably not more than 5%; the trixylenyl phosphate mixture will then be of lower viscosity with the result that the plasticising properties of the trixylenyl phosphate will be improved. Such a trixylenyl phosphate will have plasticising properties substantially equal to those of commercial tritolyl phosphate. If the mixture comprising the trixylenyl phosphate is obtained from a xylenol fraction derived from the products of the high or low temperature carbonisation of coal, it will be understood that the mixture will generally contain phosphates of phenols other than xylenols (except phosphates of ortho-cresol, ortho-ethylphenol and ortho-propylphenol). Thus the mixture will generally also contain phosphates of meta- and para-ethylphenol and of 2-methyl-4-ethyl-phenol.

According to the invention furthermore, a fraction of tar acids is provided, particularly a cresol fraction and/or a xylenol fraction, which is free from ortho-alkyl monohydric phenols, particularly ortho-cresol, ortho-ethylphenol and ortho-propylphenol. Although it is a matter to some difficulty to remove the three ortho-phenols fully from any raw material which is used for the production of the phosphate esters, it can be done by careful fractionation and a product which is virtually free from traces of the three ortho-phenols can be obtained, from which the non-toxic plasticiser can be produced. A suitable fraction may, for example, have an initial boiling point of 219°–220° C. and a final boiling point of 232°–233° C. The preferred tar acid fraction is that (boiling range 220°–232.5° C.) employed in Example 2 hereinafter given.

The invention also provides a process for the production of a non-toxic plasticiser which comprises the conversion of a phenolic fraction, for example, a cresol fraction comprising the meta and para isomers of cresol or a xylenol fraction, which is free from ortho-cresol, ortho-ethylphenol and ortho-propylphenol into the corresponding phosphates.

The mixture of phosphate esters of the invention can be used as a plasticiser in resins and plastics from which articles of clothing which come in contact with the human body are to be manufactured, such as a resin used for the manufacture of pants for babies.

According to the invention moreover, a food wrapping material comprises a synthetic resin or plastic, for example, polyvinyl chloride or any substance plasticised with the non-toxic plasticiser of the invention. The plasticiser may, for example, constitute between 20% and 30% of the mixture of resin and plasticiser.

During the investigations which led to the invention, it was found that the infra-red absorption pattern of ortho-ethylphenol is almost identical with that of ortho-cresol. In addition to the evidence provided by infra-red analysis, the presence of ortho-ethylphenol in a commercial meta-cresol fraction was further confirmed by removing it by steam distillation from the bottoms product obtained upon carefully fractionating the meta-cresol fraction in a column of a 50 plate efficiency and taking 20% of the fraction overhead (thus ensuring removal of all traces of ortho-cresol) and making a phenyl urethane derivative, which phenyl urethane derivative did not depress the melting point of the urethane produced from a pure sample of ortho-ethylphenol.

The boiling point of the pure sample of ortho-ethylphenol was found to be 203.7° C. at 760 mm. Hg, which figure is lower than that quoted in the literature. At an absolute pressure of 50 mm. Hg, the vapour pressures of meta-cresol and ortho-ethylphenol were found to be almost identical, so that no separation of a mixture of the two phenols is possible by fractional distillation at such a pressure. Even by fractional distillation at 760 mm. Hg, the separation of ortho-ethylphenol from a meta-cresol fraction is difficult due to the small amount of ortho-ethylphenol present in such a fraction. Typical commercial meta-paracresol fractions which are used for the production of tritolyl phosphate, have been found to contain about 2–3% of ortho-ethylphenol in addition to a minimum of 3% of ortho-cresol.

Toxicity tests were carried out with phosphate esters produced from pure samples of ortho-cresol, ortho-ethylphenol and ortho-propylphenol. Furthermore, commercial tritolyl phosphate and trixylenyl phosphate were tested as well as the phosphate ester obtained in the examples hereinafter given.

Chickens of the age of 3 to 12 months were used in determining the toxicity of the phosphate esters, since the sensitivity of chickens to the phosphates is approximately of the same order as the sensitivity of human beings. Chickens are much more sensitive to the toxic effects of these phosphate esters than are other experimental animals such as mice and rats, and it is for this reason that chickens were used for the experiments.

The nervous system of a chicken is attacked when a phosphate ester containing a toxic phosphate is fed to it. The first symptoms were generally noticed after 10 days and a slow progressive paralysis was observed. If the dose of the toxic substance is sufficiently large, then death occurs after the paralysis. The effect of the toxic substance on the chickens was confirmed by histological examination of the nerves in the spinal cord and in the brain. The histological observations always confirmed the clinical findings. In addition, toxicity tests have been carried out on other animals including dogs, cats, rats, hamsters and guinea pigs.

The invention is illustrated by the following examples. Example 1 illustrates the production of a meta-cresol fraction free from ortho-cresol and ortho-ethylphenol and the production of a non-toxic tritolyl phosphate therefrom, and Example 2 illustrates the production of a xylenol fraction free from ortho-alkylphenols and the production of a non-toxic trixylenyl phosphate therefrom.

*Example 1*

A commercial meta-cresol fraction was fractionated in a column having an efficiency of at least 50 plates, in order to remove the ortho-cresol present. The remainder, the bottoms product, was fractionally distilled with water. Ortho-ethylphenol is more volatile in steam than meta/paracresol and the xylenols, and the ortho-ethylphenol could therefore be removed by this method.

The composition of the product of the steam distillation was as follows:

|  | Percent |
|---|---|
| Meta-cresol | 48 |
| Para-cresol | 35 |
| 2:4/2:5-dimethylphenol | 17 |

153 parts of phosphorus oxychloride was reacted with 340 parts of this meta/para cresol fraction. The phosphate esters of the phenols were formed in the usual manner. The mixture of esters so obtained was found to be non-toxic.

*Example 2*

A crude tar acid fraction was carefully fractionated in columns containing from 45 to 60 fractionation trays and a fraction having the following boiling range was separated:

|  | ° C. |
|---|---|
| I.B.P. | 220 |
| 5% | 221.1 |
| 50% | 222.9 |
| 70% | 223.2 |
| 95% | 224.2 |
| F.B.P. | 232.5 |

The chemical composition of the fraction, as determined by infra-red analytical methods, was approximately as follows:

|  | Percent |
|---|---|
| 3:5-xylenol | 31 |
| Meta/para-ethylphenol | 16 |
| 3:4-xylenol | 18 |
| 2-methyl-4-ethylphenol and 2-methyl-5-ethylphenol | 30 |
| Others | 5 |

It will be noted that the fraction is not only free from ortho-cresol and ortho-ethylphenol, but is also free from ortho-normal-propylphenol which has a boiling point of 217.5° C.

The fraction was first pretreated to remove all basic substances and it was then redistilled in order to purify this fraction further.

153 parts of phosphorus oxychloride were added to 300 parts of the redistilled fraction. 0.7% of aluminium chloride was then added to the mixture and the temperature was slowly raised to 250° C., and after the reaction had died down the mixture was maintained at 250° C. for three hours. The reaction mixture was then twice distilled at an absolute pressure of 3 mm. Hg and the final product was treated with steam in order to remove any odour. The phosphate ester so obtained was waterwhite and of low acidity and it was found to be completely non-toxic. The qualities as a plasticiser of this non-toxic phosphate ester mixture were found to be approximately the same as those of a commercial tritolyl phosphate.

It will be understood that the analysis of the xylenol fraction given above is merely that of a particular fraction. The invention comprises any tar acid fraction similar to that given above, provided that it is free from ortho-cresol, ortho-ethylphenol and ortho-propyl phenol.

As hereinbefore stated, the toxicity tests were carried out on chickens of an age between 3 and 12 months. The phosphate esters were fed to the chickens in varying amounts. The results of the toxicity tests which are an average of a series of experiments each involving more than 12 birds (more than 100 birds in the case of the non-toxic trixylenyl phosphate plasticiser of the invention) are given below:

|  | Mg./kg. toxic |
|---|---|
| (1) Tri-ortho-cresyl phosphate | 50/100 |
| (2) Tri-ortho-ethylphenyl phosphate | 100/200 |
| (3) Tri-ortho-propylphenyl phosphate | 100/200 |
| (4) Commercial tritolyl phosphate | 200/300 |

(The toxicity of tritolyl phosphate can vary and obviously depends on the amount of ortho-cresol and ortho-ethylphenol present in the raw material.)

| (5) Commercial trixylenyl phosphate | 1000/2000 |
|---|---|

(Here again the toxicity can vary according to the amount of ortho-cresol, ortho-ethylphenol and ortho-propylphenol present in the raw material.)

| (6) Phosphate esters made from raw material free from ortho-cresol, ortho-ethylphenol and ortho-propylphenol as described in Examples 1 and 2 | 2500 |
|---|---|

The tritolyl phosphate prepared according to Example 1, that is to say, a tritolyl phosphate made from the raw material which consisted of meta- and para-cresols and a small amount of xylenols and which was absolutely free from ortho-cresol and ortho-ethylphenol was, as stated above, found to be completely non-toxic.

In the case of the phosphate esters (1) to (5), paralysis was observed in the chickens when fed with the amount of phosphate ester stated. The nerves of the spine and the brain of the birds were investigated and it was found that they all showed a strong attack when clinical signs were observed.

More than 100 birds were dosed with the stated amount of 2,500 mg./kg. of the plasticiser, No. (6), of the invention. None of these birds showed any sign of paralysis or gave any other clinical sign which would indicate that the plasticiser had a detrimental effect. At least 25 birds were killed and the nerves of the spine and the brain were histologically examined. No damage or histological change was found.

Long feeding experiments with chickens were also carried out and for ten months birds received 50 mg./kg. per day of the non-toxic phosphate ester or plasticiser without any detrimental effect.

Furthermore, over 50 rats, dogs, cats, hamsters and guinea pigs have been fed with the non-toxic plasticiser without any adverse effect.

Thus the phosphate plasticiser according to the invention is non-toxic and can be used in food wrappings, food conveyors and in articles which come in contact with the human body.

We claim:

1. In a process of reacting phosphating agents with xylenol fractions, the improvement of producing non-toxic triaryl phosphate plasticizers which comprises using as a starting material xylenol fractions which are free from ortho-cresol, mono-ortho-ethyl phenol and mono-ortho-propylphenol.

2. In a process of reacting cresol fractions with phosphating agents, the improvement of producing non-toxic triaryl phosphate plasticizers which comprises using as a starting material cresol fractions which are free from ortho-cresol, and mono-ortho-ethyl phenol.

3. Non-toxic aryl phosphate plasticizers produced according to the process of claim 1.

4. Non-toxic aryl phosphate plasticizers produced according to the process of claim 2.

References Cited in the file of this patent

UNITED STATES PATENTS

| | | |
|---|---|---|
| 1,208,833 | Ramage | Dec. 9, 1916 |
| 1,439,128 | Runge et al. | Dec. 19, 1922 |
| 2,194,215 | Bruson et al. | Mar. 19, 1940 |
| 2,237,632 | Ries | Apr. 8, 941 |
| 2,401,608 | Brurawoy | June 4, 1946 |
| 2,473,612 | Shuman | June 21, 1949 |
| 2,518,692 | Hull et al. | Aug. 15, 1950 |
| 2,633,456 | Vaughan | Mar. 31, 1953 |
| 2,661,366 | Gamrath | Dec. 1, 1953 |
| 2,805,240 | Prahl | Sept. 3, 1957 |

FOREIGN PATENTS

| | | |
|---|---|---|
| 459,217 | Great Britain | Sept. 30, 1935 |
| 450,891 | Great Britain | July 27, 1936 |

OTHER REFERENCES

Beilstein: Vol. 6, page 482 (Vierte Auflage).